Jan. 22, 1935.  F. B. HAMBLIN  1,988,655
SCALE
Filed Aug. 16, 1933
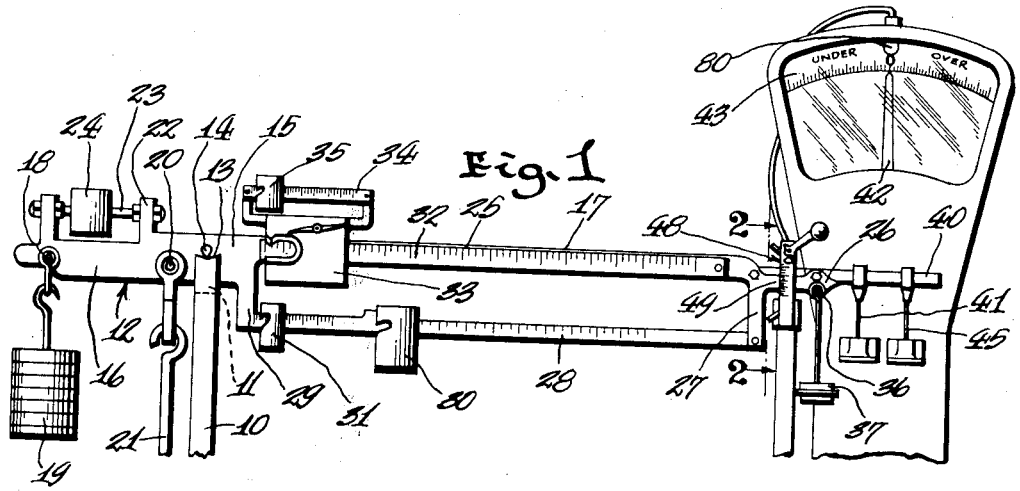
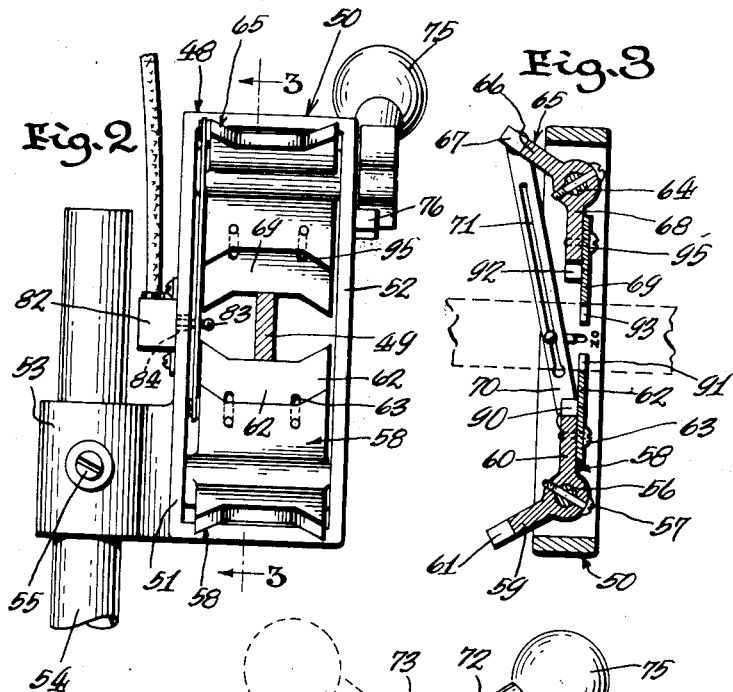
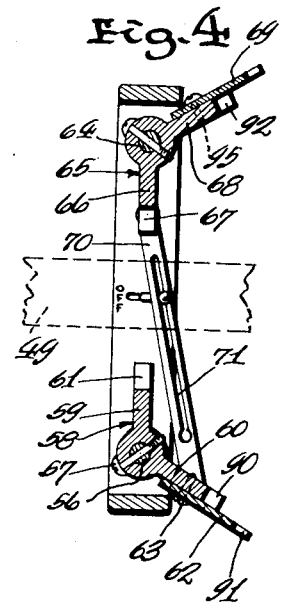
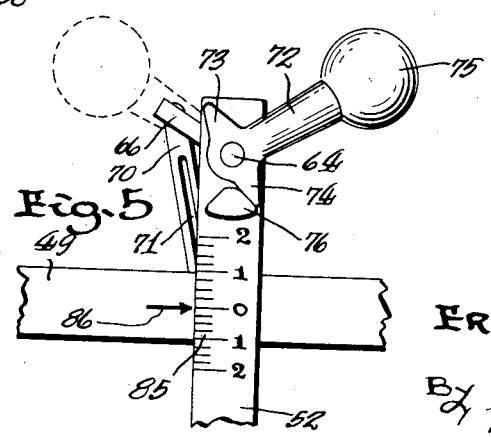
FRED B. HAMBLIN
INVENTOR
BY Freeman & Weidman
ATTORNEYS Patented Jan. 22, 1935

1,988,655

UNITED STATES PATENT OFFICE 1,988,655

SCALE

Fred. B. Hamblin, North Olmstead, Ohio

Application August 16, 1933, Serial No. 685,337

1 Claim. (Cl. 265—49)

This invention relates to scales, and the principal object of the invention is to provide a new and improved device of this character.

In the drawing accompanying this specification and forming a part of this application, I have shown, for purposes of illustration, one form which my invention may assume, and in this drawing:

Figure 1 is a fragmentary side elevational view of an embodiment of the invention, Figure 2 is an enlarged vertical sectional view, corresponding substantially to the line 2—2 of Figure 1, and showing control means for locking the weighing beam in a level or predetermined position, Figure 3 is a vertical sectional view corresponding substantially to the line 3—3 of Figure 2, and showing the parts of the control means in one operative position, Figure 4 is a vertical sectional view similar to Figure 3, but showing the parts of the control means in another operative position, while Figure 5 is a fragmentary side elevational view of the weighing beam control means.

The embodiment of the invention herein described comprises a beam support 10, not completely shown, provided at its upper end with bifurcated portions 11, between which is disposed a weighing beam 12, and the extreme end of each of the bifurcated portions 11 is provided with a shallow V-shaped notch 13 for the free reception of a beam pivot 14, extending laterally from opposite sides of the body portion 15 of the weighing beam 12, and cooperating therewith to provide a fulcrum pivot for the beam 12. The beam pivot 14 is wedge-shaped and has a knife-edge which is hardened and ground to a sharp and accurately straight edge and which rests freely in the notches 13 in the bifurcated portions 11, and the latter may be surfaced with agate, or other hard smooth substance, in such a manner as to permit free movement of the beam pivot 14 with practically no frictional resistance.

The beam pivot 14 is positioned off center with respect to the weighing beam 12 at a predetermined multiple and provides unequal lever arms, as indicated at 16 and 17. The shorter lever arm 16 is provided with a wedge-shaped back balance pivot 18 which extends laterally from the opposite sides thereof, and is provided with an upwardly directed knife-edge which pivotally supports a back balance weight 19. Disposed intermediate the beam pivot 14 and the back balance pivot 18 is a load pivot 20 extending laterally from opposite sides of the beam 12, and provided with an upwardly directed knife-edge which pivotally supports a steel yard rod 21, not completely shown, extending downwardly and suitably connected to a platform or other device on which the mass to be weighed is placed.

Disposed longitudinally along the short lever arm 16 are two upwardly extending arms 22 spaced for the accommodation of a rod 23 threaded for the reception of a back balance poise 24, for a purpose obvious to those skilled in the art.

The longer lever arm 17 comprises a longitudinally extending beam 25 terminating in a tip 26, and having a depending arm 27 to which may be secured one end of a suitable lower scale 28, the other end of which is affixed to an arm 29 depending from the beam body portion 15, and slidably disposed along the scale 28 is a large poise 30 and a smaller poise 31. The beam 25 has a suitable upper scale 32, and a slidably mounted large poise 33, carrying a smaller scale 34 upon which a smaller poise 35 is slidably mounted. Projecting laterally from opposite sides of the beam tip 26 is a wedge-shaped tip-pivot 36 having its knife-edge directed upwardly and from which is suspended a counterpoise 37 if used. The knife-edges of the pivots 14, 18, 20, and 36 are arranged along a pivot line in the usual manner.

Rigidly attached to the upper beam 25 and the beam tip 26 and projecting longitudinally thereof is a beam extension 40 to which is attached a pull rod 41 suitably connected to a pointer 42 adapted to travel over a graduated over or under scale 43 so as to indicate the position of the weighing beam 12 under or over the weight or the mass being weighed. And also affixed to the beam extension 40 is another pull rod 45 suitably connected to a dash pot, not shown, adapted to dampen the oscillations of the pointer 42.

A trig gate 48 is provided for cooperation with the mechanism thus far described, and comprises a frame 50 having side frame members 51 and 52, through which freely projects a reduced portion 49 of the weighing beam 12, and the side frame member 51 is provided with a cylindrical extension 53 for adjustable engagement with a rigid support 54, not completely shown, and threaded into the cylindrical extension 53 is a screw 55 to hold the frame 50 in adjusted position with respect to the weighing beam 12.

Journaled in the side frame members 51 and 52, adjacent the lower ends thereof, is a shaft 56 to which is rigidly secured, by means of a bolt 57, an angular clamp 58 having unequal side walls 59 and 60, the shorter wall 59 being provided with an open-mouth recess 61, and the longer wall 60 also having an open-mouthed recess 90, and affixed to the longer wall 60 is a plate 62 having an open-mouthed recess 91 extending beyond the end of the wall 60, and the plate 62 is adjustable with respect to the end of the wall 60 by means of a slot and screw connection 63. Journaled at the upper end of the frame 50, by means of a shaft 64, is another clamp 65, identical in all respects to the clamp 58, except for its opposite disposition, and provided with a short wall 66 having an open-mouthed recess 67, and a longer wall 68 having a recess 92, and adjustably mounted on the wall 68 by a screw and slot connection 95 is a plate 69 having an open-mouthed recess 93.

Pivotally secured to the wall 60 of the clamp 58 and to the wall 66 of the clamp 65, is a link 70 having an elongated slot 71, and operable to effect synchronous movement of the clamps 58 and 65, and rigidly attached to a projection of the shaft 64 is a handle 72 provided with a pair of arms 73 and 74, diametrically disposed with respect to the shaft 64, and adapted to engage a stop 76 mounted on the side frame member 52 to limit movement of the handle 72 and of the clamps 58 and 65. The end of the handle 72 is provided with an over-balancing weight 75 adapted to hold the handle 72 and the clamps 58 and 65 in one operative position or the other.

The clamps 58 and 65 in one position as shown in Figure 3, lock the weighing beam 12 in level or balanced position to prevent longitudinal shifting of the knife-edge of the beam pivot 14 in the notches 13, and in another position as shown in Figure 4, permit free movement of the weighing beam 12 from its level position.

Mounted adjacent the over and under scale 43 is an electric lamp 80 suitably connected in circuit with a source of electrical energy, and with a switch 82 of any well known toggle action type, which is mounted on the side frame member 51 of the frame 50 and has a switch lever 83 projecting through a laterally extending slot 84 in the side frame member 51 and slidably engaged within the elongated slot 71 in the link 70, whereby manipulation of the over-balanced handle 72 to the position for holding the weighing beam in level or balanced position moves the switch handle 83 in such direction as to deenergize the lamp 80, and when the weighing beam 12 is free to swing within the opening defined by the recessed clamps 58 and 65 the switch lever 83 is in position to energize the lamp 80 to illuminate the over or under scale 43.

An over or under scale 85 is also provided on the side frame member 52 and is adapted to register with a pointer 86 on the reduced portion 49 of the weighing beam 12, to indicate the weight of the unknown mass over or under the set scale weights.

When the mass to be weighed is placed upon the weighing platform, the clamps 58 and 65 of the trig gate 48 are opened through manipulation of the handle 72, to release the weighing beam 12, and the latter swings downwardly from its level or balanced position, if the mass is under the set weights, causing the pointer 42 to move to the left, as viewed in Figure 1, or if the mass is greater than the set weights, then the weighing beam 12 swings upwardly from its level or balanced position, and moves the pointer 42 to the right, as viewed in Figure 1, to indicate the over weight of the mass with respect to the set weights. Movement of the clamps 58 and 65 to open position provides a predetermined opening between the recesses 61 and 67 thereof, limiting the distance the beam 12 can travel with respect to its level or balanced position, and also limiting the movement of the pointer 42 on either side of the zero balance of the scale 43, and movement of the clamps 58 and 65 to an open position also effects movement of the link 70 and of the switch lever 83 to energize the lamp 80. When the beam 12 reaches a position indicating balance, the handle 72 is manipulated to move the clamps 58 and 65 to a position to engage the beam 12 and lock the same in this position.

The weighing beam 12 is thereby held in level or balanced position when not in use, and the loads are simultaneously carried by all of the pivots 18, 20 and 36 and are always suspended from the knife-edges thereof, without the eccentric disposition of the loads with reference to the pivots which occurs in ordinary types of scales. Particularly with reference to the beam pivot 14, it will be noted that the knife-edge thereof rests in perfect vertical alignment with the center of the notches 13 in the beam support 10, when the beam is in locked position, and there is no tendency to shift this pivot out of the notches such as takes place in cases where the beam is locked in an off-level or off-balance position. The wear on all of the pivots is at right angles to the vertical line of the pivots, hence the multiple of the lever does not change, thus insuring accuracy to a degree unkown to scales using trig gates that lock the beam in an unlevel position.

From the foregoing it will be understood by those skilled in the art that the embodiment herein disclosed accomplishes at least the principal object of the invention, that it has uses and advantages other than those herein particularly referred to, and that my gate means may be used in other types of weighing machines, as equal-armed beam balances, and that a straight weighing scale, or types of scales may be employed other than the over or under scale 43 herein described; and that various other changes and modifications may be made without departing from the spirit of the invention, and accordingly the embodiment disclosed herein is illustrative only and the invention is not limited thereto.

I claim:

A device of the character described, comprising: a beam support; a beam fulcrumed on said beam support; clamping mechanism having oscillatable means operable to lock and unlock said beam, and having a member connecting together said oscillatable means to effect simultaneous operation of the same; an electric switch operatively connected with said member, operated by the latter when said clamping mechanism is operated; and over-balanced means for operating said clamping mechanism, over-balanced to hold said oscillatable means in either their locked or unlocked positions.

FRED. B. HAMBLIN.